US012753721B2

(12) United States Patent
Gover

(10) Patent No.: US 12,753,721 B2
(45) Date of Patent: Oct. 6, 2026

(54) GAS TURBINE ENGINE WITH ELECTRIC MACHINE IN ENGINE CORE

(71) Applicant: Pratt & Whitney Canada Corp., Longueuil (CA)

(72) Inventor: Christopher Gover, Longueuil (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 17/828,631

(22) Filed: May 31, 2022

(65) Prior Publication Data

US 2023/0387750 A1 Nov. 30, 2023

(51) Int. Cl.
*F02C 7/06* (2006.01)
*F02C 7/32* (2006.01)
*F02N 11/00* (2006.01)
*H02K 7/18* (2006.01)

(52) U.S. Cl.
CPC .................. *F02C 7/06* (2013.01); *F02C 7/32* (2013.01); *F02N 11/003* (2013.01); *F05D 2220/766* (2013.01); *H02K 7/1823* (2013.01)

(58) Field of Classification Search
CPC ............ H02K 7/1823; F02C 7/06; F02C 7/32
See application file for complete search history.

(56) References Cited

U.S. PATENT DOCUMENTS 2,987,637 A * 6/1961 Bertsche ................ H02K 19/24 310/263
3,184,624 A * 5/1965 Solomon ................ H02K 9/197 310/90
4,514,652 A * 4/1985 Olson .................... H02K 19/38 310/90
4,531,357 A * 7/1985 Weber ....................... F02C 7/32 60/39.83
10,071,811 B2 9/2018 Kupiszewski
10,308,366 B2 6/2019 Kupiszewski
10,644,630 B2 5/2020 Smith
(Continued)

OTHER PUBLICATIONS

EP Search Report for EP Patent Application No. 23176160.2 dated Sep. 18, 2023.
(Continued)

*Primary Examiner* — Ted Kim
(74) *Attorney, Agent, or Firm* — Getz Balich LLC

(57) ABSTRACT

A gas turbine engine assembly includes an engine core and an electric machine. The engine core includes a first rotating structure, a second rotating structure, a combustor and a flowpath. The first rotating structure includes a first structure turbine rotor. The second rotating structure includes a second structure compressor rotor, a second structure turbine rotor and a second structure shaft connecting the second structure compressor rotor to the second structure turbine rotor. The second structure compressor rotor, the combustor, the second structure turbine rotor and the first structure turbine rotor are arranged sequentially along the flowpath. The electric machine is arranged within the engine core. The electric machine includes an electric machine rotor and an electric machine stator adjacent the electric machine rotor. The electric machine rotor is rotatable with the second rotating structure and located between the second structure compressor rotor and the first structure turbine rotor.

14 Claims, 11 Drawing Sheets

(56) References Cited

U.S. PATENT DOCUMENTS

| | | | | |
|---|---|---|---|---|
| 11,156,128 | B2 | 10/2021 | Miller | |
| 2007/0245709 | A1* | 10/2007 | Dooley | F02C 7/32 60/767 |
| 2007/0256421 | A1 | 11/2007 | Dooley | |
| 2008/0110151 | A1 | 5/2008 | Welch | |
| 2013/0125561 | A1 | 5/2013 | Schwarz | |
| 2013/0219917 | A1* | 8/2013 | Suciu | F02C 7/185 60/785 |
| 2018/0051701 | A1 | 2/2018 | Kupiszewski | |
| 2018/0156112 | A1* | 6/2018 | Mohseni | F02C 7/16 |
| 2019/0085715 | A1 | 3/2019 | Van Der Merwe | |
| 2019/0234239 | A1* | 8/2019 | Tsujimoto | F02C 7/06 |
| 2020/0055610 | A1 | 2/2020 | Terwilliger | |
| 2021/0010382 | A1 | 1/2021 | Davies | |
| 2021/0010383 | A1 | 1/2021 | Bradley | |
| 2021/0010384 | A1 | 1/2021 | Bradley | |
| 2021/0018008 | A1 | 1/2021 | Muldoon | |
| 2021/0079850 | A1 | 3/2021 | Davies | |
| 2021/0246837 | A1* | 8/2021 | Romero | F02C 7/32 |
| 2021/0324802 | A1 | 10/2021 | Bonnoitt | |
| 2022/0042458 | A1* | 2/2022 | Long | F02C 7/12 |
| 2023/0220785 | A1 | 7/2023 | Muldoon | |

OTHER PUBLICATIONS

EP Office Action for EP Patent Application No. 23176160.2 dated Sep. 22, 2025.

* cited by examiner

GAS TURBINE ENGINE WITH ELECTRIC MACHINE IN ENGINE CORE

TECHNICAL FIELD

This disclosure relates generally to a gas turbine engine and, more particularly, to an electric machine for the gas turbine engine.

BACKGROUND INFORMATION

A gas turbine engine may include an electric motor such as a starter motor for providing mechanical power and an electric generator for providing electricity. The electric motor and the electric generator are typically connected to a gearbox outside of a core of the gas turbine engine, where the gearbox is coupled with a rotor within the engine core via a tower shaft. Some efforts have been made to arrange the electric motor and/or the electric generator within the engine core to reduce an overall size of the gas turbine engine. However, there is a need in the art for arrangements and systems which facilitate arrangement of an electric motor and an electric generator within an engine core.

SUMMARY

According to an aspect of the present disclosure, an assembly is provided for a gas turbine engine. This gas turbine engine assembly includes an engine core and an electric machine. The engine core includes a first rotating structure, a second rotating structure, a combustor and a flowpath. The first rotating structure includes a first structure turbine rotor. The second rotating structure includes a second structure compressor rotor, a second structure turbine rotor and a second structure shaft connecting the second structure compressor rotor to the second structure turbine rotor. The second structure compressor rotor, the combustor, the second structure turbine rotor and the first structure turbine rotor are arranged sequentially along the flowpath. The electric machine is arranged within the engine core. The electric machine includes an electric machine rotor and an electric machine stator adjacent the electric machine rotor. The electric machine rotor is rotatable with the second rotating structure and located between the second structure compressor rotor and the first structure turbine rotor.

According to another aspect of the present disclosure, another assembly is provided for a gas turbine engine. This gas turbine engine assembly includes an engine core and an electric machine. The engine core includes a rotating structure, a combustor and a flowpath. The rotating structure includes a compressor rotor, a turbine rotor and a shaft connecting the compressor rotor to the turbine rotor. The compressor rotor, the combustor and the turbine rotor are arranged sequentially along the flowpath. The electric machine is arranged within the engine core. The electric machine includes an electric machine rotor and an electric machine stator adjacent the electric machine rotor. The electric machine rotor is rotatable with the rotating structure. The combustor is arranged radially outboard of and extends circumferentially about the electric machine.

According to still another aspect of the present disclosure, another assembly is provided for a gas turbine engine. This gas turbine engine assembly includes an engine core, a drive shaft and an electric machine. The engine core includes a rotating structure, a combustor and a flowpath. The rotating structure is rotatable about a first axis. The rotating structure includes a compressor rotor, a turbine rotor and a rotating structure shaft connecting the compressor rotor to the turbine rotor. The compressor rotor, the combustor and the turbine rotor are arranged sequentially along the flowpath. The drive shaft is rotatable about a second axis that is angularly offset from the first axis, and the drive shaft is rotatable with the rotating structure. The electric machine is arranged within the engine core. The electric machine includes an electric machine rotor and an electric machine stator adjacent the electric machine rotor. The electric machine rotor is mounted to the drive shaft.

The rotating structure may be rotatable about an axis. The electric machine rotor may be located axially between the compressor rotor and the turbine rotor.

The rotating structure may be configured as or otherwise include a high pressure spool.

The assembly may also include a plurality of bearings. These bearings may rotatably support the shaft. The bearings may include a first bearing and a second bearing. The electric machine rotor may be disposed between the first bearing and the second bearing. The electric machine rotor may be mounted to the shaft.

The second rotating structure may be rotatable about an axis. The electric machine may be located axially between the second structure compressor rotor and the second structure turbine rotor.

The combustor may be radially outboard of and may circumscribe the electric machine.

A portion of the flowpath between the combustor and the second structure turbine rotor may be radially outboard of and may circumscribe the electric machine.

The second rotating structure may be rotatable about an axis. The second structure turbine rotor may be located axially between the electric machine and the second structure compressor rotor.

The electric machine is configurable as an electric motor during a motor mode of operation. The electric machine may also or alternatively be configurable as an electric generator during a generator mode of operation.

The electric machine rotor may be mounted to the second structure shaft.

The assembly may also include a bearing rotatably supporting the second rotating structure. The bearing and the electric machine may be disposed within a bearing compartment within the engine core.

The assembly may also include a plurality of bearings. These bearings may rotatably support the second rotating structure. The bearings may include a first bearing and a second bearing. The electric machine may be disposed between the first bearing and the second bearing.

The second rotating structure may be rotatable about an axis. The electric machine rotor may be axially adjacent the first bearing and/or the second bearing.

The assembly may also include a bearing and a lubrication system. The bearing may rotatably support the second rotating structure. The lubrication system may be configured to direct lubricant through the electric machine to the bearing.

The assembly may also include a lubrication system configured to direct lubricant to the electric machine stator and then to the electric machine rotor.

The assembly may also include an engine case. This engine case may house and/or extend circumferentially about the first rotating structure, the second rotating structure, the combustor and/or the electric machine.

The assembly may also include a propulsor rotor outside of the engine core. The propulsor rotor may be rotatably driven by the first rotating structure.

The first rotating structure may also include a first structure compressor rotor and a first structure shaft connecting the first structure compressor rotor to the first structure turbine rotor. The first structure compressor rotor, the second structure compressor rotor, the combustor, the second structure turbine rotor and the first structure turbine rotor may be arranged sequentially along the flowpath.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
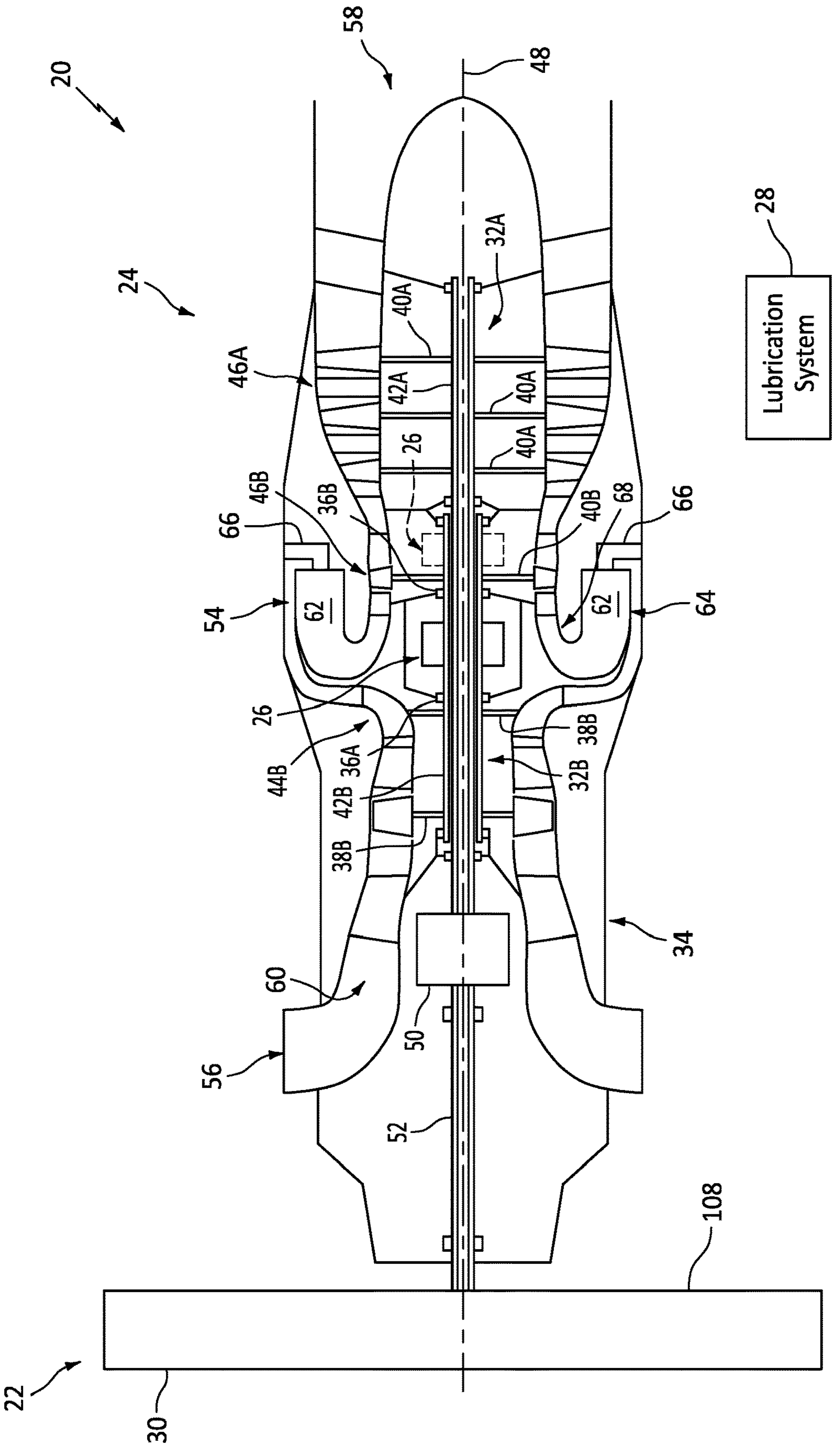
FIG. 1 is a schematic illustration of a gas turbine engine.

FIG. 1 schematically illustrates a gas turbine engine 20 for an aircraft. This gas turbine engine 20 may be included within a propulsion system for the aircraft. The gas turbine engine 20 of FIG. 1, for example, is configured as a turboprop gas turbine engine. The gas turbine engine 20, however, may alternatively be configured as a turbofan gas turbine engine, a turbojet gas turbine engine, a turboshaft gas turbine engine, or any other gas turbine engine capable of producing aircraft thrust. The gas turbine engine 20 may alternatively be included within an electrical power generation system for the aircraft. The gas turbine engine 20, for example, may be configured as an auxiliary power unit (APU). Furthermore, it is contemplated the gas turbine engine 20 may still alternatively be configured for non-aircraft applications. The gas turbine engine 20, for example, may be configured as a (e.g., ground-based) industrial gas turbine engine for an electrical power generation system.

The gas turbine engine 20 of FIG. 1 includes a mechanical load 22 and a gas turbine engine core 24 configured to drive rotation of the mechanical load 22. This gas turbine engine 20 also includes an electric machine 26 and a lubrication system 28.

The mechanical load 22 may be configured as or otherwise include a rotor 30 of the gas turbine engine 20. This rotor 30 may be configured as a bladed propulsor rotor, which propulsor rotor includes a plurality of rotor blades arranged circumferentially around and connected to a rotor hub or disk. The rotor 30 of FIG. 1, for example, is configured as an open propellor rotor for the turboprop gas turbine engine. The rotor 30, however, may alternatively be configured as a ducted fan rotor for the turbofan gas turbine engine, a compressor rotor for the turbojet gas turbine engine, or a helicopter rotor (e.g., a main rotor) for the turboshaft gas turbine engine. The mechanical load 22 may alternatively be configured as a generator rotor for the power generation system.

The engine core 24 of FIG. 1 includes one or more rotating structures 32A and 32B (generally referred to as "32") (e.g., spools) and a stationary structure 34. This engine core 24 also includes a plurality of bearings (e.g., 36A and 36B (generally referred to as "36") rotatably mounting the rotating structures 32 to the stationary structure 34; see also FIG. 2.

The first (e.g., low speed, low pressure) rotating structure 32A includes a bladed first structure turbine rotor 40A and a first structure shaft 42A. The first structure turbine rotor 40A includes a plurality of rotor blades arranged circumferentially around and connected to one or more rotor disks. The first structure turbine rotor 40A of FIG. 1 is configured as a low pressure turbine (LPT) rotor. This first structure turbine rotor 40A is arranged within and part of a low pressure turbine (LPT) section 46A of the engine core 24, which LPT section 46A may also be referred to as a power turbine. The first structure shaft 42A of FIG. 1 is configured as a low speed shaft. This first structure shaft 42A extends axially along a rotational axis 48 to and is connected to the first structure turbine rotor 40A, which rotational axis 48 may be parallel and/or coaxial with an axial centerline of the gas turbine engine 20 and its engine core 24. The first rotating structure 32A and its components 40A and 42A are rotatable about the rotational axis 48.

The first rotating structure 32A of FIG. 1 is also rotatably coupled to the mechanical load 22 and its rotor 30; e.g., the propeller rotor. The rotor 30 of FIG. 1, for example, is connected to and rotatably driven by a transmission 50 through a rotor shaft 52. This transmission 50 is connected to and rotatably driven by the first structure turbine rotor 40A through the first structure shaft 42A. The transmission 50 may be configured as a geartrain such as, but not limited to, an epicyclic geartrain. With such a geared coupling between the first rotating structure 32A and the rotor 30, the rotor 30 may rotate at a different (e.g., slower) rotational speed than the first rotating structure 32A. Of course, in other embodiments, the first rotating structure 32A may alternatively be coupled to the rotor 30 through a direct drive coupling (e.g., without the transmission 50) such that the first rotating structure 32A and the rotor 30 rotate at a common (the same) rotational speed.

The second (e.g., high speed, high pressure) rotating structure 32B includes a bladed second structure compressor rotor 38B, a bladed second structure turbine rotor 40B and a second structure shaft 42B. Each of the rotors 38B and 40B includes a plurality of rotor blades arranged circumferentially around and connected to one or more respective rotor disks. The second structure compressor rotor 38B of FIG. 1 is configured as a high pressure compressor (HPC) rotor. This second structure compressor rotor 38B is arranged within and part of a high pressure compressor (HPC) section 44B of the engine core 24. The second structure turbine rotor 40B of FIG. 1 is configured as a high pressure turbine (HPT) rotor. This second structure turbine rotor 40B is arranged within and part of a high pressure turbine (HPT) section 46B of the engine core 24. The second structure shaft 42B of FIG. 1 is configured as a high speed shaft. This second structure shaft 42B extends axially along the rotational axis 48 between and is connected to the second structure compressor rotor 38B and the second structure turbine rotor 40B. The second rotating structure 32B and its components 38B, 40B and 42B are rotatable about the rotational axis 48. The second rotating structure 32B of FIG. 1 and its second structure shaft 42B also axially overlap and circumscribe the first structure shaft 42A; however, the engine core 24 of the present disclosure is not limited to such an exemplary arrangement.

The stationary structure 34 includes an engine case configured to at least partially or completely house the HPC section 44B, a combustor section 54 of the engine core 24, the HPT section 46B and the LPT section 46A, where the engine sections 44B, 54, 46B and 46A may be arranged sequentially along the rotational axis 48 between an airflow inlet 56 to the gas turbine engine 20 and an exhaust 58 from the gas turbine engine 20. The stationary structure 34 of FIG. 1 and its engine case axially overlap and extend circumferentially about (e.g., completely around) the first rotating structure 32A and its components 40A and 42A as well as the second rotating structure 32B and its components 38B, 40B and 42B.

During operation, air enters the gas turbine engine 20 through the airflow inlet 56, which airflow inlet 56 may be located at (e.g., on, adjacent or proximate) a forward end of the engine core 24. This air is directed into at least a core flowpath 60 which extends sequentially through the engine sections 44B, 54, 46B and 46A (e.g., the engine core 24) to the exhaust 58, which exhaust 58 may be located at an aft end of the gas turbine engine 20 and its engine core 24. The air within this core flowpath 60 may be referred to as "core air".

The core air is compressed by the second structure compressor rotor 38B and directed into a (e.g., annular) combustion chamber 62 of a (e.g., annular) combustor 64 in the combustor section 54. Fuel is injected into the combustion chamber 62 through one or more fuel injectors 66 and mixed with the compressed core air to provide a fuel-air mixture. This fuel-air mixture is ignited and combustion products thereof flow through and sequentially cause the second structure turbine rotor 40B and the first structure turbine rotor 40A to rotate. The rotation of the second structure turbine rotor 40B drives rotation of the second structure compressor rotor 38B and, thus, compression of the air received from the airflow inlet 56. The rotation of the first structure turbine rotor 40A drives rotation of the rotor 30. Where the rotor 30 is configured as the propulsor rotor, the rotor 30 propels additional air outside of (or through) the gas turbine engine 20 to provide aircraft propulsion system thrust. Where the rotor 30 is configured as the generator rotor, rotation of the rotor 30 facilitates generation of electricity.

The electric machine 26 of FIG. 1 is integrated into and (e.g., completely) located within the engine core 24. The electric machine 26, for example, may be arranged axially between the second structure compressor rotor 38B and the first structure turbine rotor 40A. The electric machine 26 of FIG. 1, in particular, is arranged axially between (e.g., an aftmost, downstream-most disk of) the second structure compressor rotor 38B and (e.g., a forwardmost, upstream-most disk of) the second structure turbine rotor 40B. The electric machine 26 may also or alternatively be arranged radially beneath the combustor section 54 and the core flowpath 60. For example, the combustor 64 and/or a portion 68 of the core flowpath 60 between the combustor 64 and the second structure turbine rotor 40B may be disposed radially outboard of, axially aligned with (e.g., overlap) and/or extend circumferentially about (e.g., completely around, circumscribe) at least a portion or an entirety of the electric machine 26. With the foregoing arrangement, the electric machine 26 may be located in a (e.g., otherwise unused) space within the engine core 24, rather than at an outer periphery of the engine core 24. Locating the electric machine 26 within the engine core 24 may facilitate reduction in an overall size of the gas turbine engine 20.

The electric machine 26 may be configurable as an electric motor and/or an electric generator. For example, during a motor mode of operation, the electric machine 26 may operate as the electric motor to convert electricity (e.g., received from a battery and/or another electrical power source) into mechanical power. This mechanical power may be utilized for various purposes within the gas turbine engine 20 such as, for example, rotating the rotor 30 and/or rotating the second rotating structure 32B during gas turbine engine startup. During a generator mode of operation, the electric machine 26 may operate as the electric generator to convert mechanical power received from, for example, the second rotating structure 32B and/or the rotor 30 into electricity. This electricity may be utilized for various purposes within the gas turbine engine 20 such as, for example, electrically powering one or more electric components of the gas turbine engine 20 (e.g., pumps, motors, etc.) and/or charging the power source. The electricity may also or alternatively be utilized for various purposes outside of the gas turbine engine 20 such as, for example, electrically powering one or more electric components in the aircraft.

Figure 2:
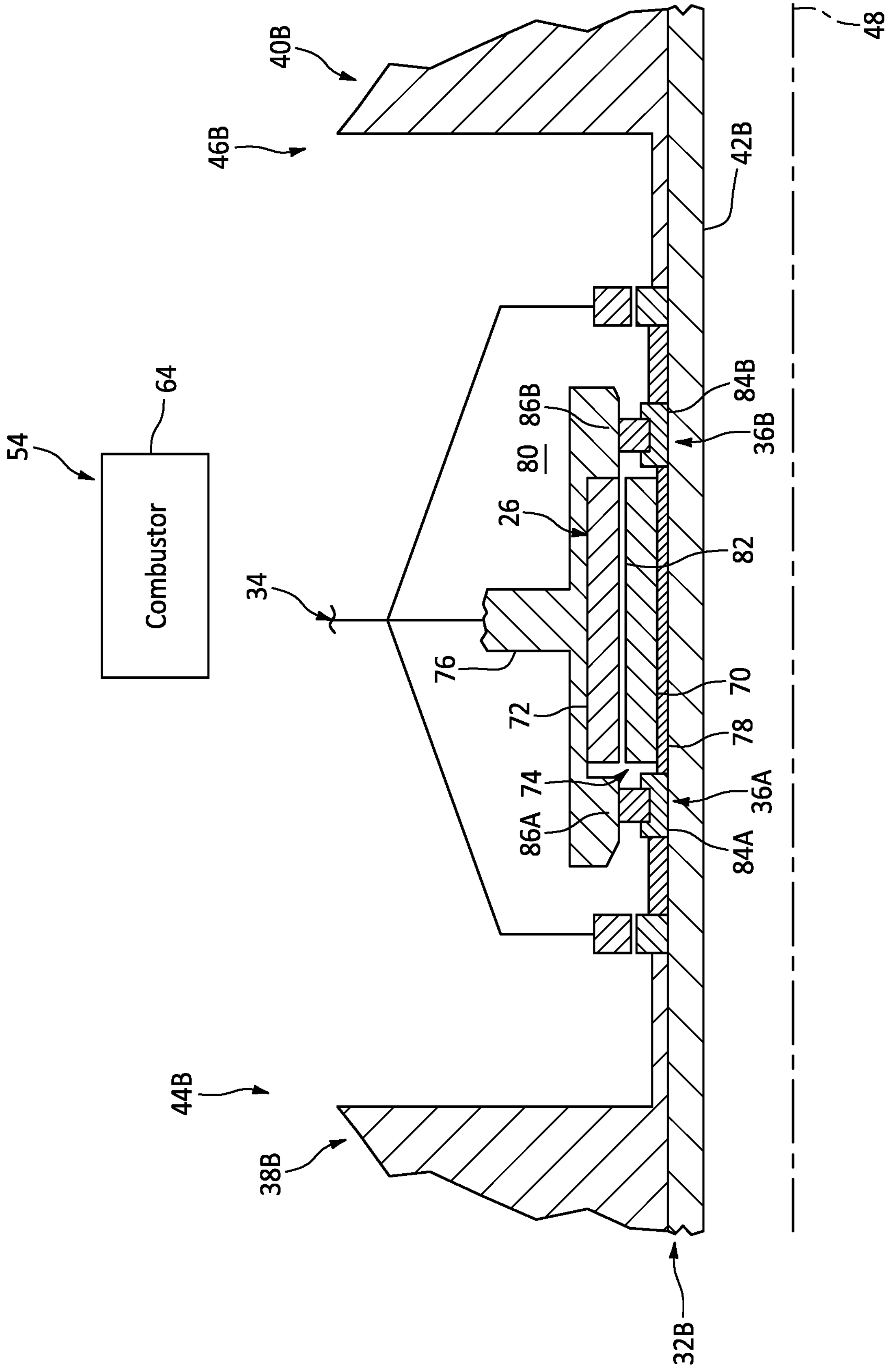
FIG. 2 is a schematic illustration of a portion of an electric machine located between a compressor rotor and a turbine rotor of a high-speed rotating structure of the gas turbine engine.

Referring to FIG. 2, the electric machine 26 includes an (e.g., tubular) electric machine rotor 70 and an (e.g., tubular) electric machine stator 72. The electric machine 26 and its components 70 and 72 are arranged within a cavity 74; e.g., an annular cavity. This cavity 74 is radially between the second rotating structure 32B and the stationary structure 34. The cavity 74 of FIG. 2, for example, extends radially between and to an internal support structure 76 of the stationary structure 34 (within the engine case) and a tubular sleeve 78 mounted to and rotatable with the second structure shaft 42B. The cavity 74 of FIG. 2 also extends axially between and to the first bearing 36A and the second bearing 36B. These bearings 36 rotatably support the second rotating structure 32B and its second structure shaft 42B. The bearings 36 are supported by and attached to the stationary structure 34 and its support structure 76. The bearings 36 and the electric machine 26 and its components 70 and 72 may collectively be arranged within a common (the same) bearing compartment 80; however, the present disclosure is not limited to such an exemplary arrangement.

The machine rotor 70 may be configured as or otherwise include one or more magnets; e.g., permanent magnets. The machine rotor 70 is connected (e.g., fixedly mounted) to the second rotating structure 32B and its second structure shaft 42B. The machine rotor 70 of FIG. 2, for example, is mounted onto the tubular sleeve 78 on the second structure shaft 42B. The machine rotor 70, however, may alternatively be mounted onto another rotating structure component such as, for example, directly onto the second structure shaft 42B where the tubular sleeve 78 is omitted. The machine rotor 70 is configured to rotate with the second rotating structure 32B and its second structure shaft 42B about the rotational axis 48.

The machine stator 72 may be configured as or otherwise include one or more coils of electrically conductive elements; e.g., wires. The machine stator 72 of FIG. 2 axially overlaps the machine rotor 70 along the rotational axis 48, and extends circumferentially about (e.g., completely around, circumscribes) the machine rotor 70. The machine rotor 70 of FIG. 2 is thereby disposed within a bore of the machine stator 72. However, the machine stator 72 may be radially spaced from the machine rotor 70 by an annular radial clearance gap 82; e.g., an air gap. The machine stator 72 may thereby be located in close proximity to, but may not contact, the machine rotor 70. The machine stator 72 is connected (e.g., fixedly mounted) to the stationary structure 34. The machine stator 72 of FIG. 2, for example, is mounted to the support structure 76, within a bore of the support structure 76.

The machine rotor 70 may be located axially between inner races 84A and 84B of the bearings 36A and 36B. The machine stator 72 may be located axially between outer races 86A and 86B of the bearings 36A and 36B, which outer races 86A and 86B of FIG. 2 are formed as integral parts of the support structure 76. By arranging the electric machine 26 and its components 70 and 72 axially between and/or in close proximity to the bearings 36 supporting the second rotating structure 32B, the bearings 36 may maintain the radial clearance gap 82 between the machine stator 72 and the machine rotor 70. The electric machine 26 may thereby be configured without its own dedicated bearings. The present disclosure, however, is not limited to such an exemplary arrangement. For example, in other embodiments, one of the bearings 36A, 36B may be omitted and/or the electric machine 26 may be configured with its own dedicated bearing(s).

Figure 3:
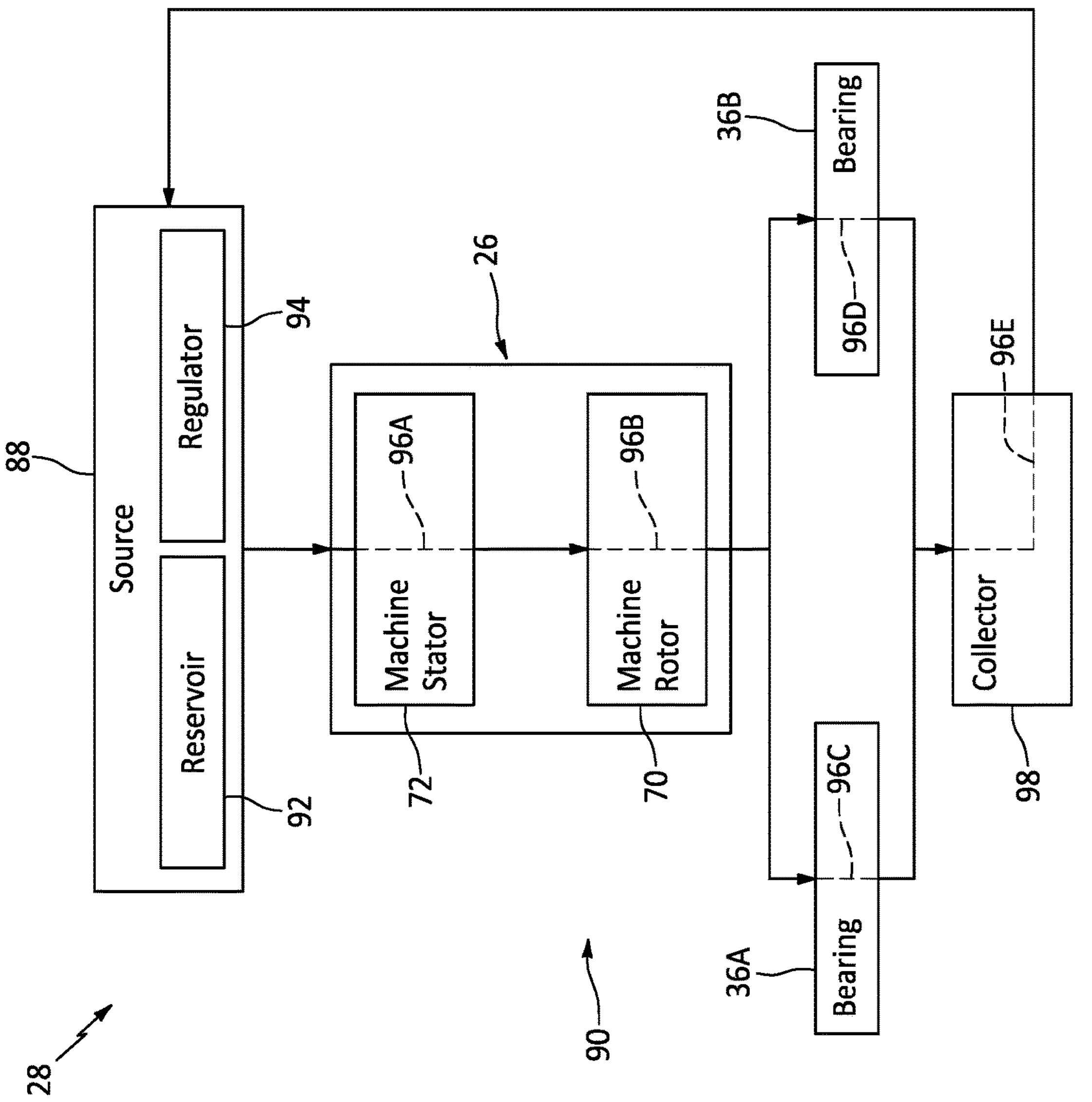
FIG. 3 is a schematic illustration of a lubrication system for the gas turbine engine.

Referring to FIG. 3, the lubrication system 28 is configured to provide lubricant (e.g., oil or another liquid) to various components of the gas turbine engine 20 during operation of the gas turbine engine 20. This lubricant may lubricate the engine components and/or cool the engine components. The lubrication system 28 of FIG. 3 includes a lubricant source 88 and at least one lubricant circuit 90.

The lubricant source 88 is configured to provide the lubricant to the lubricant circuit 90 during lubrication system operation. The lubricant source 88 may also be configured to store (e.g., contain a quantity of) the lubricant before, during and/or after lubrication system operation. The lubricant source 88 of FIG. 3, for example, includes a lubricant reservoir 92 and a lubricant flow regulator 94. The lubricant flow regulator 94 may be or otherwise include a pump and/or a valve. This lubricant flow regulator 94 is configured to direct the lubricant received from the lubricant reservoir 92 to the lubricant circuit 90.

The lubricant circuit 90 includes one or more internal volumes 96A-E (generally referred to as "96") for one or more respective components 72, 70, 36A, 36B and 98 of the gas turbine engine 20. Each of the internal volumes 96 may be or otherwise include an internal cavity, an internal passage and/or another space within and/or at least partially or completely formed by a respective engine component, which internal volume is adapted to receive the lubricant. For example, each volume 96A, 96B may be configured as or otherwise include a passage and/or a cavity formed by and/or within the electric machine 26. More particularly, the stator volume 96A may be configured as or otherwise include a passage and/or a cavity formed by and/or within the machine stator 72. The rotor volume 96B may be configured as or otherwise include a passage and/or a cavity formed by and/or within the machine rotor 70. The first bearing volume 96C may be configured as or otherwise includes a passage within and/or a space at least partially formed by and/or within the first bearing 36A. The second bearing volume 96D may be configured as or otherwise includes a passage within and/or a space at least partially formed by and/or within the second bearing 36B. The collector volume 96E may be configured as or otherwise include a space at least partially formed by the lubricant collector 98; e.g., a sump, a gutter, etc. The lubricant circuit 90 of the present disclosure, however, is not limited to the foregoing exemplary internal volumes nor the foregoing exemplary collection of turbine engine components. For example, in other embodiments, any one or more of the internal volumes 96 may be omitted from the lubricant circuit 90 and/or serviced by another lubricant circuit of the lubrication system 28.

Figure 4A:
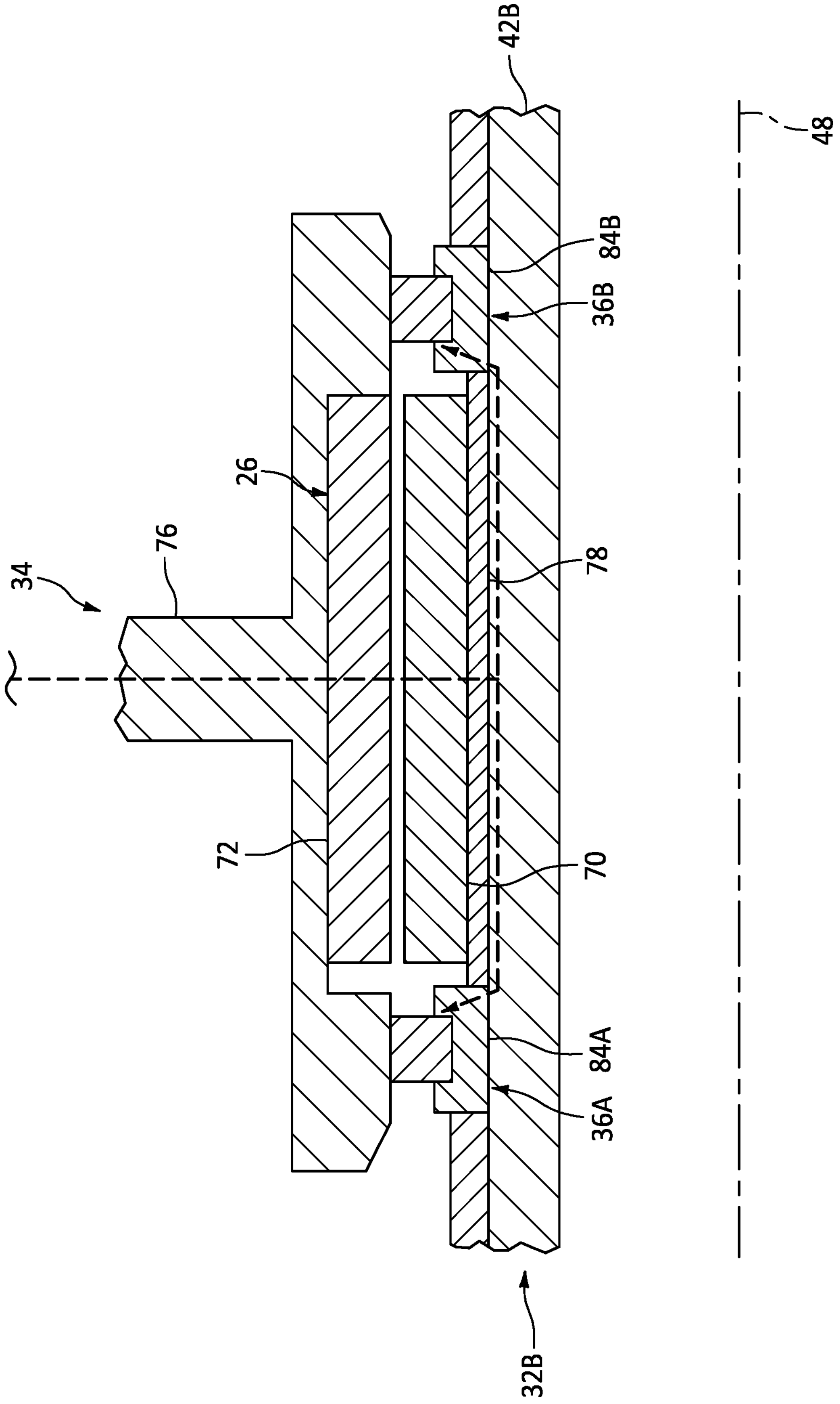
FIGS. 4A and 4B illustrations schematically depicting various lubricant flow paths within the gas turbine engine.
Figure 4B:
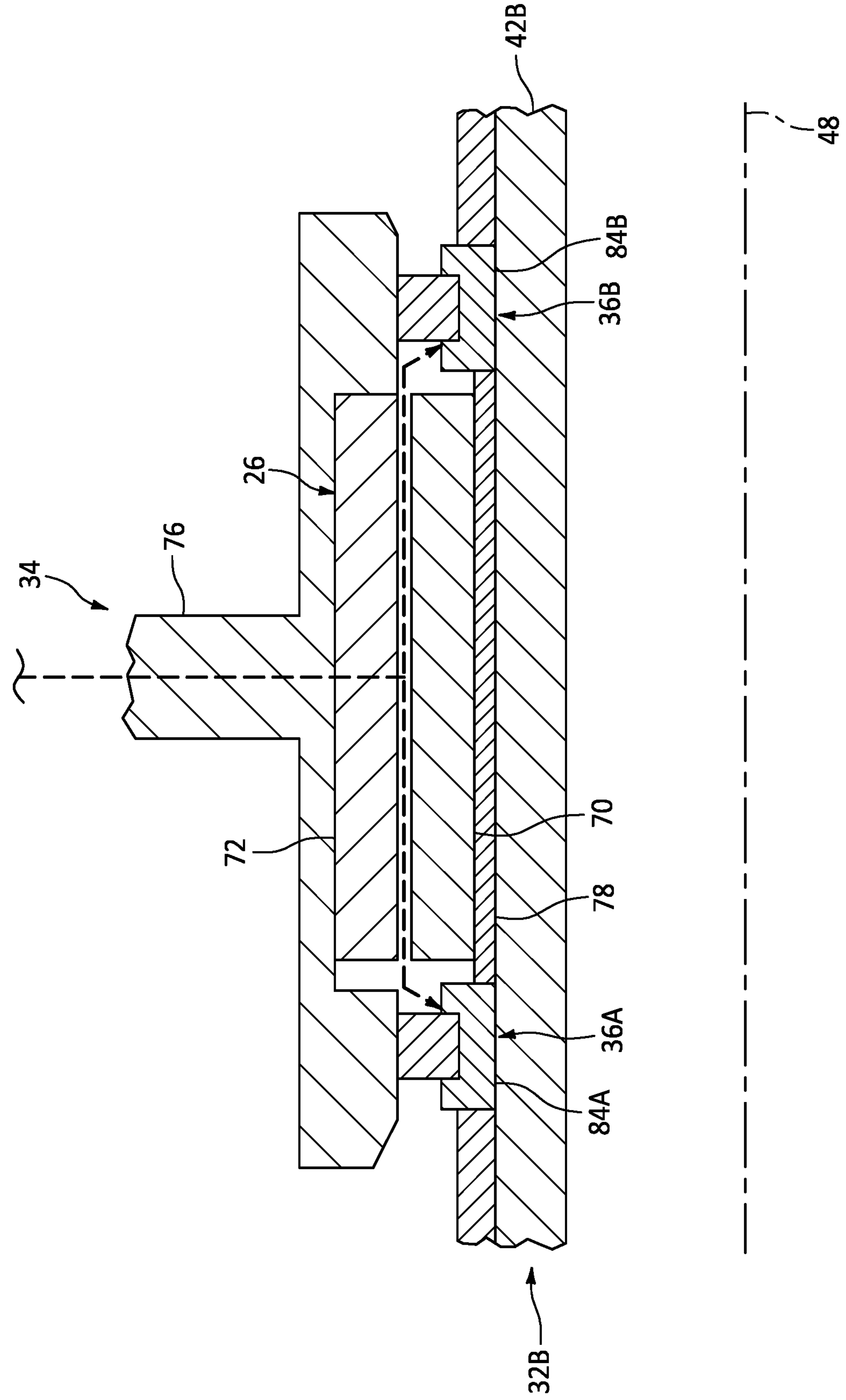

The lubricant circuit 90 is configured to provide the lubricant to the electric machine 26 and its components 70 and 72 and then to the bearings 36 adjacent the electric machine 26. The stator volume 96A of FIG. 3, for example, is fluidly coupled between an outlet from the lubricant source 88 and the rotor volume 96B. The first bearing volume 96C and the second bearing volume 96D are fluidly coupled in parallel between the rotor volume 96B and the collector volume 96E, where the collector volume 96E is fluidly coupled with an inlet to the lubricant source 88. The lubricant circuit 90 may thereby direct the lubricant from the lubricant source outlet, sequentially through the stator volume 96A, the rotor volume 96B, the bearing volumes 96C and 96D and the collector volume 96E, to the lubricant source inlet. Examples of paths for routing the lubricant to/through the volumes 96A-D are shown in FIGS. 4A and 4B. The present disclosure, however, is not limited to such exemplary lubricant circuit paths.

With the foregoing lubricant circuit arrangement of FIGS. 3, 4A and 4B, the electric machine 26 receives relatively cool lubricant whereas the bearings 36 receive slightly warmer lubricant. Providing the relatively cool lubricant to the electric machine 26 may reduce or prevent heat related degradation of material(s) such as resin, etc. within the electric machine 26 and its windings. By contrast, the material(s) and operation of the bearings 36 may be designed and/or capable of more affectively using the warmer lubricant.

Figure 5:
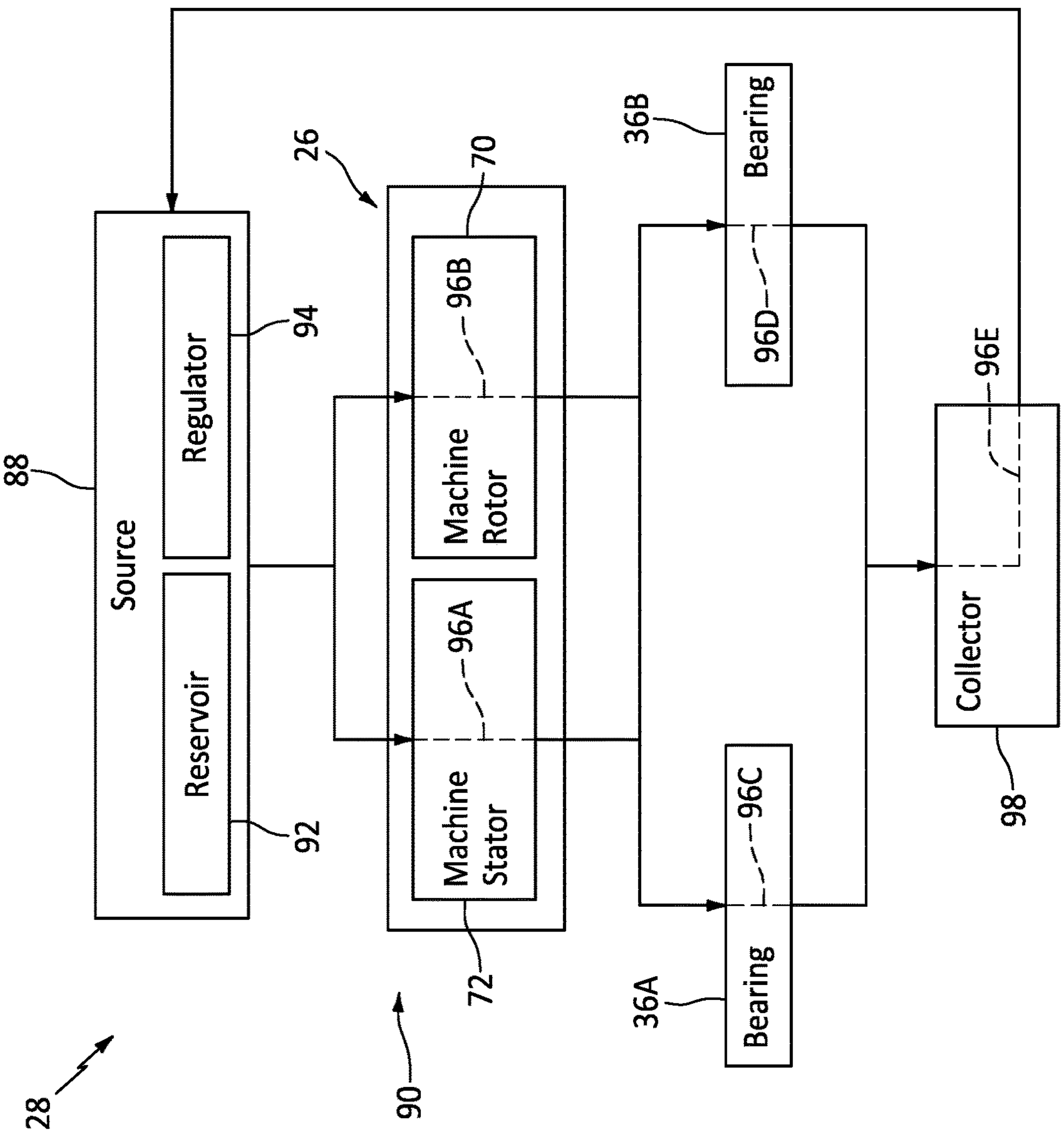
FIGS. 5-9 are schematic illustrations of the lubrication system with various other lubricant circuit arrangements.
Figure 6:
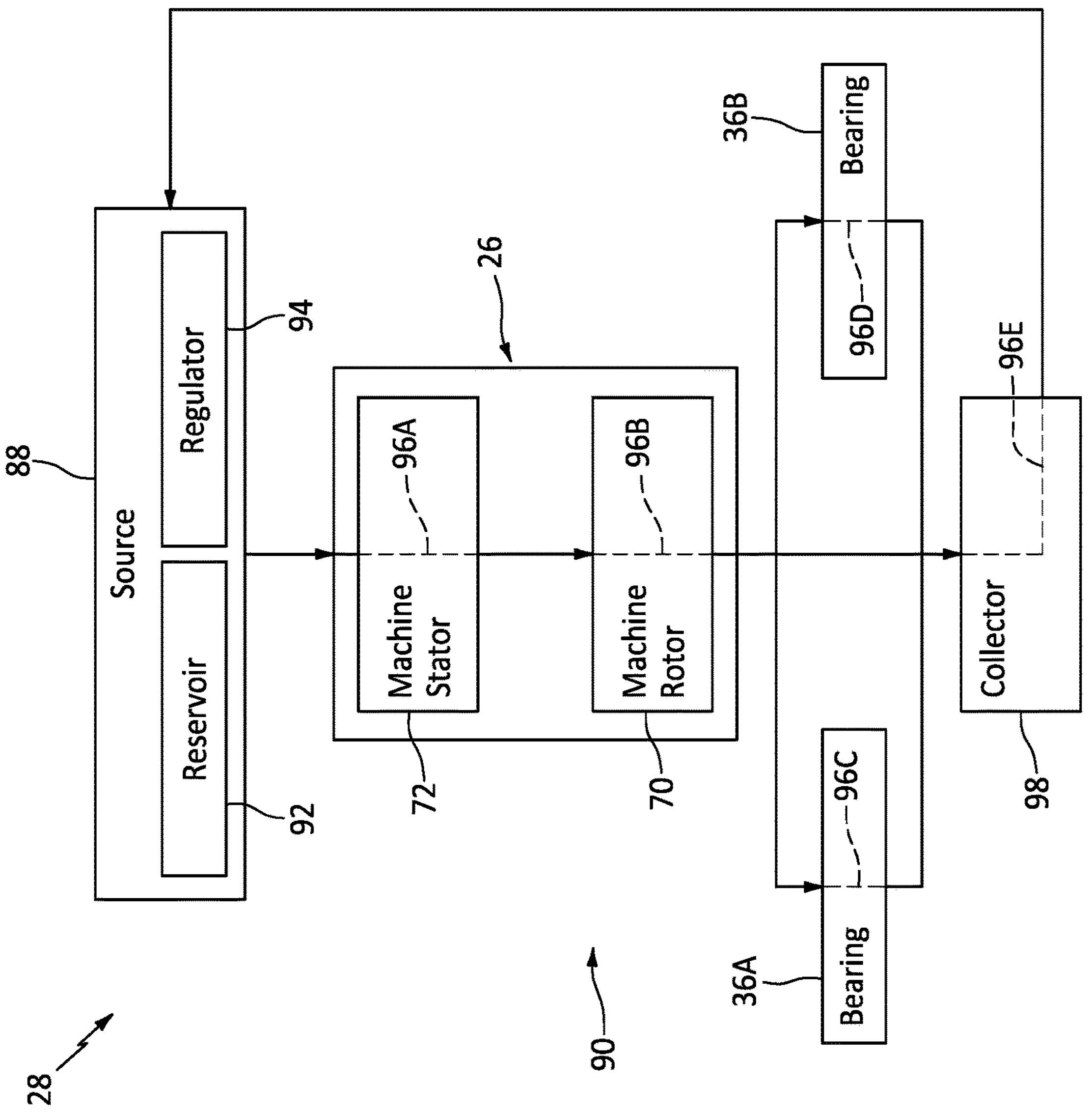
Figure 7:
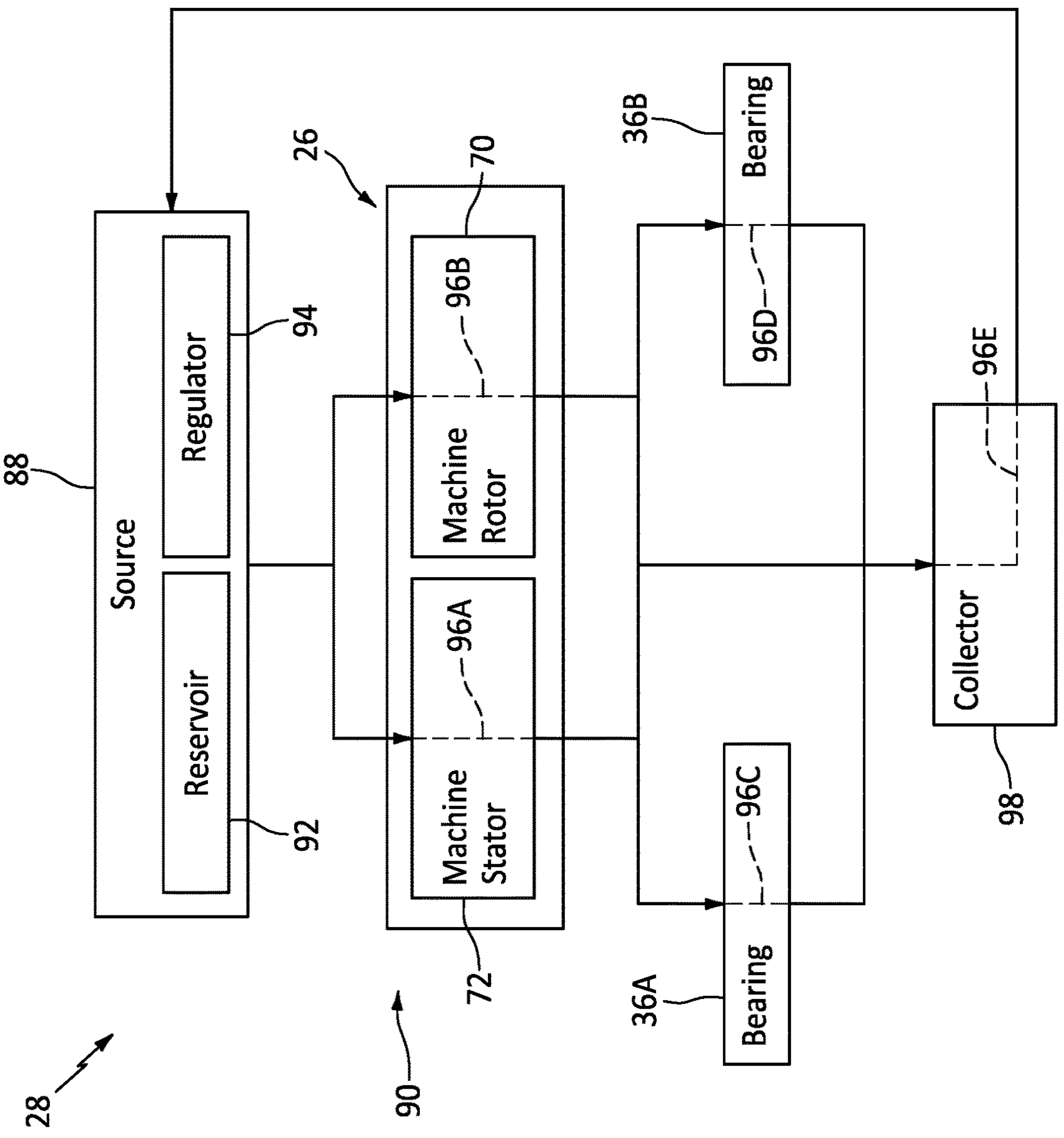
Figure 9:
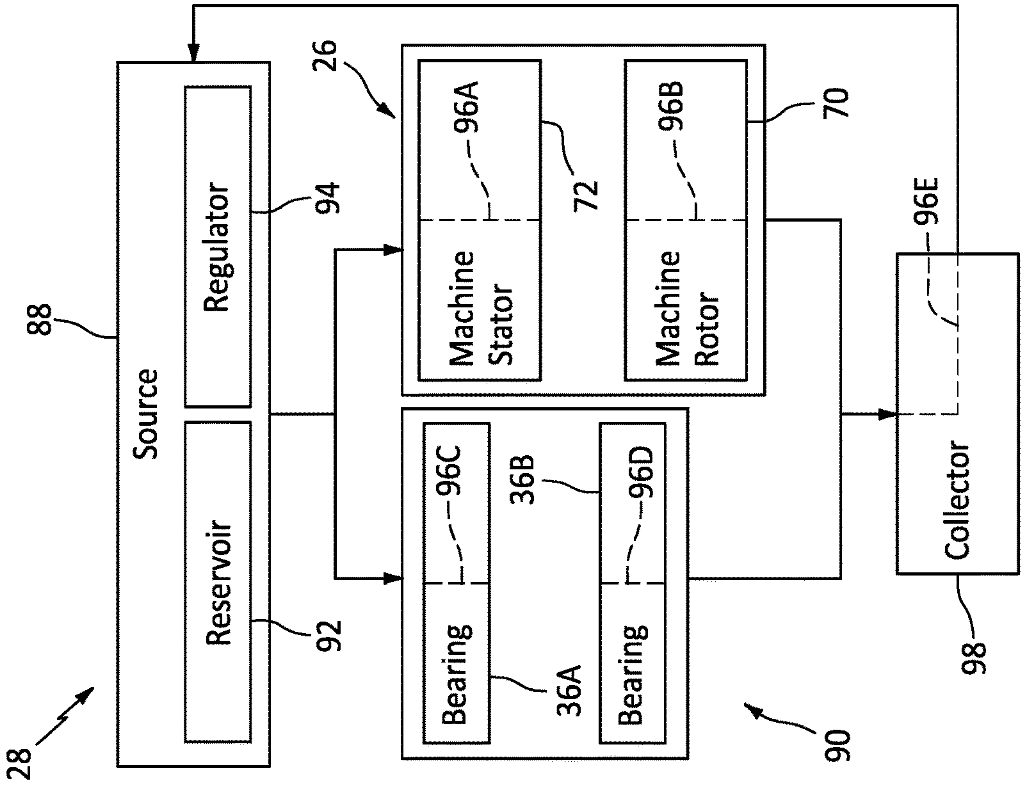
Figure 8:
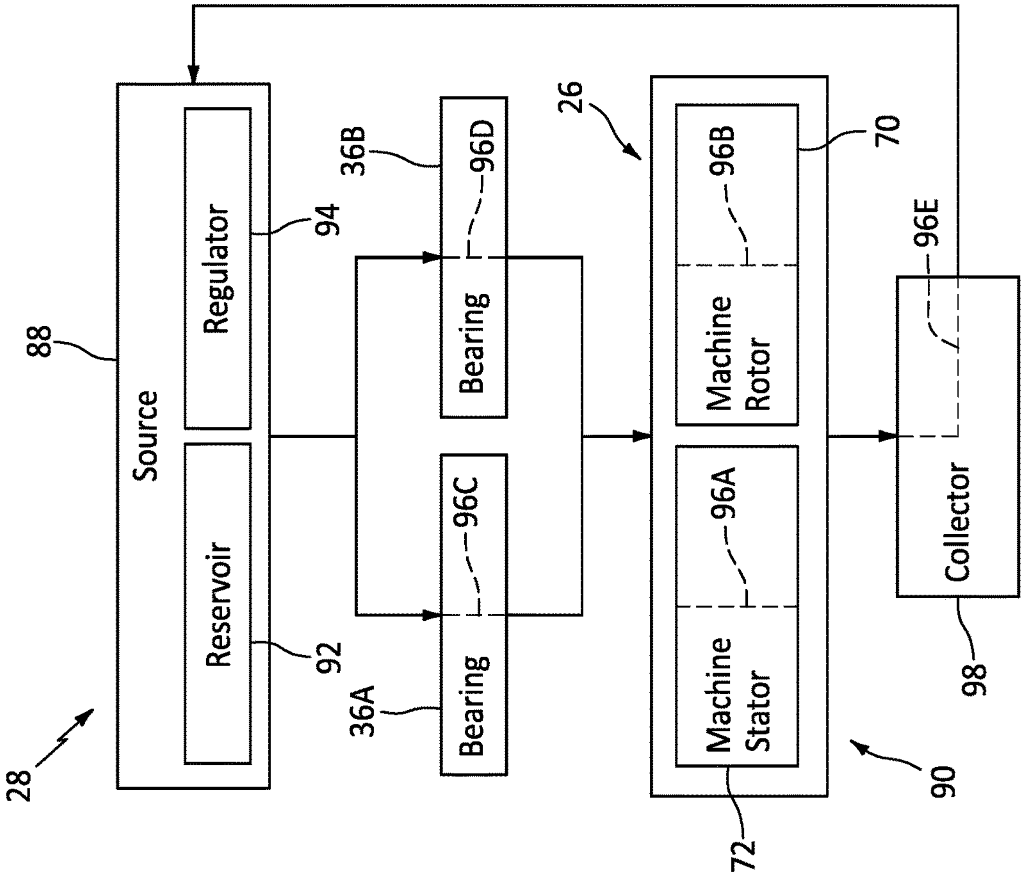

In the lubrication system 28 of FIG. 3, the stator volume 96A and the rotor volume 96B are fluidly coupled in series where the stator volume 96A is upstream of the rotor volume 96B. In other embodiments however, referring to FIG. 5, the stator volume 96A and the rotor volume 96B may be fluidly coupled in parallel between the lubricant source 88 and one or more of the bearing volume(s) 96C and/or 96D. In other embodiments, referring to FIGS. 6 and 7, the collector volume 96E may also or alternatively receive at least some (or all) of the lubricant (e.g., directly) from the stator volume 96A and/or the rotor volume 96B without, for example, passing through the bearing volume(s) 96C and/or 96D. In other embodiments, referring to FIG. 8, the stator volume 96A and/or the rotor volume 96B may be fluidly coupled between the bearing volume(s) 96C and/or 96D and the collector volume 96E. In still other embodiments, referring to FIG. 9, the stator volume 96A and/or the rotor volume 96B may be fluidly coupled in parallel with the bearing volume(s) 96C and/or 96D between the lubricant source 88 and the collector volume 96E. Of course, it is contemplated the various volumes 96A-E may be arranged in various arrangements other than those explicitly shown in the drawings.

The lubrication system 28 is described above as providing the lubricant to certain exemplary engine components. It is contemplated, however, any one or more of the engine components may be omitted from the lubricant circuit 90 and/or serviced by another lubricant circuit and/or replaced by another component of the gas turbine engine 20 which may utilize the lubricant, for example, for heating, cooling and/or lubrication. The lubricant circuit 90 may also or alternatively include one or more additional fluid components other than those described above. Examples of these other components may include, but are not limited to, heat exchanger(s), sensor(s), manifold(s), additional bearing(s), nozzle(s), etc.

Figure 10:
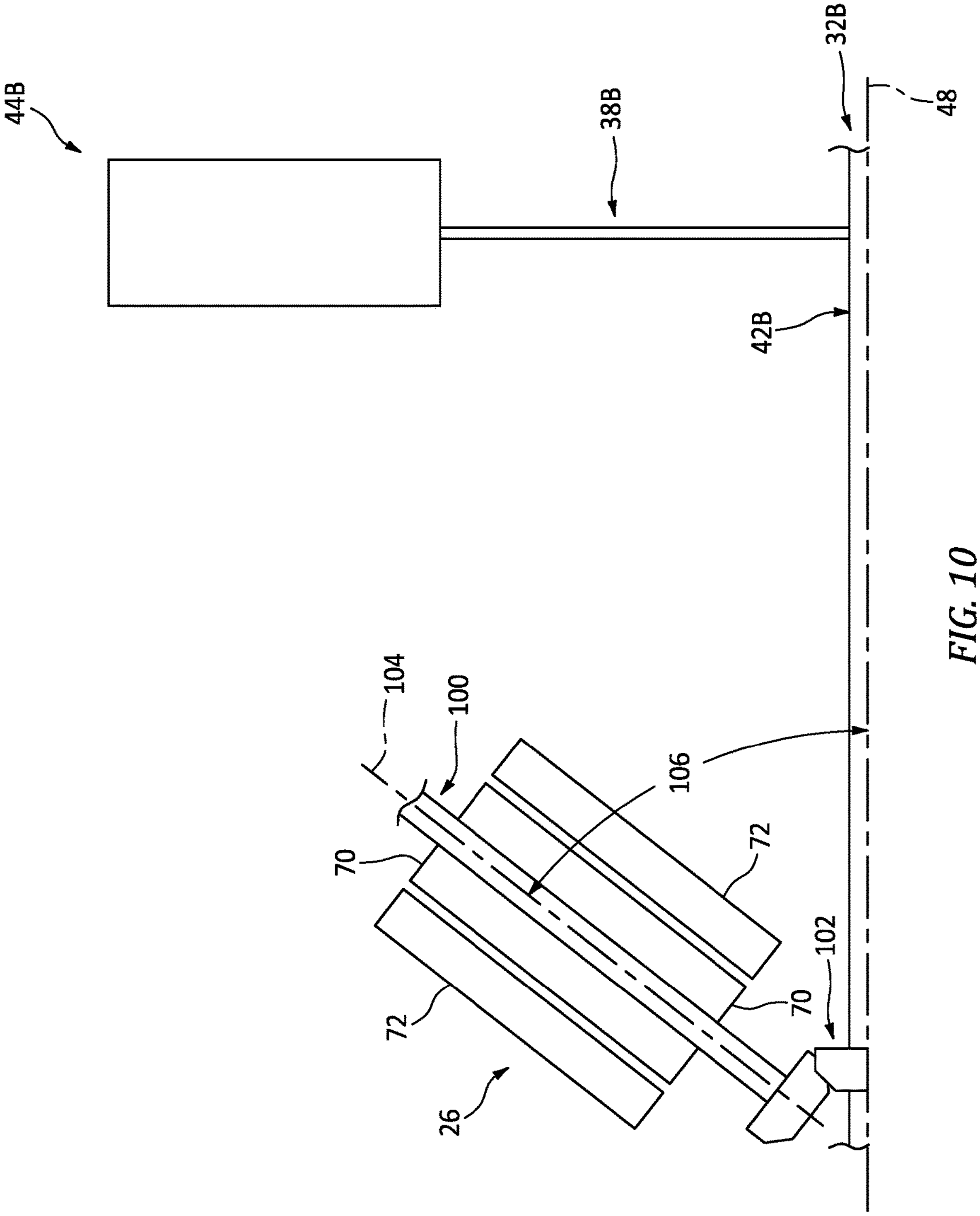
FIG. 10 is a schematic illustration of the electric machine configured with a drive shaft coupled to the high-speed rotating structure.

In some embodiments, referring to FIG. 1, the electric machine 26 and its components 70 and 72 (see FIG. 2) may be arranged axially between the second structure compressor rotor 38B and the second structure turbine rotor 40B. In other embodiments, the electric machine 26 (see dashed line in FIG. 1) and its components 70 and 72 may be arranged axially aft of the second structure turbine rotor 40B; e.g., axially between the second structure turbine rotor 40B and the first structure turbine rotor 40A. In still other embodiments, referring to FIG. 10, the electric machine 26 and its components 70 and 72 may be arranged elsewhere within the engine core 24. The electric machine 26 of FIG. 10, for example, is arranged with a drive shaft 100; e.g., an accessory shaft and/or a tower shaft. This drive shaft 100 is rotatable with one of the rotating structures 32. The drive shaft 100 of FIG. 10, for example, is coupled to the second rotating structure 32B through a geared coupling 102. The drive shaft 100 may thereby be rotatable about a drive shaft axis 104, which drive shaft axis 104 is angularly offset from the rotational axis 48 by an angle 106; e.g., an acute angle or a right angle. The machine rotor 70 is rotatable with (e.g., mounted to) the drive shaft 100. With such an arrangement, the electric machine 26 may be located axially forward of the second structure compressor rotor 38B or elsewhere within the engine core 24.

Figure 11:
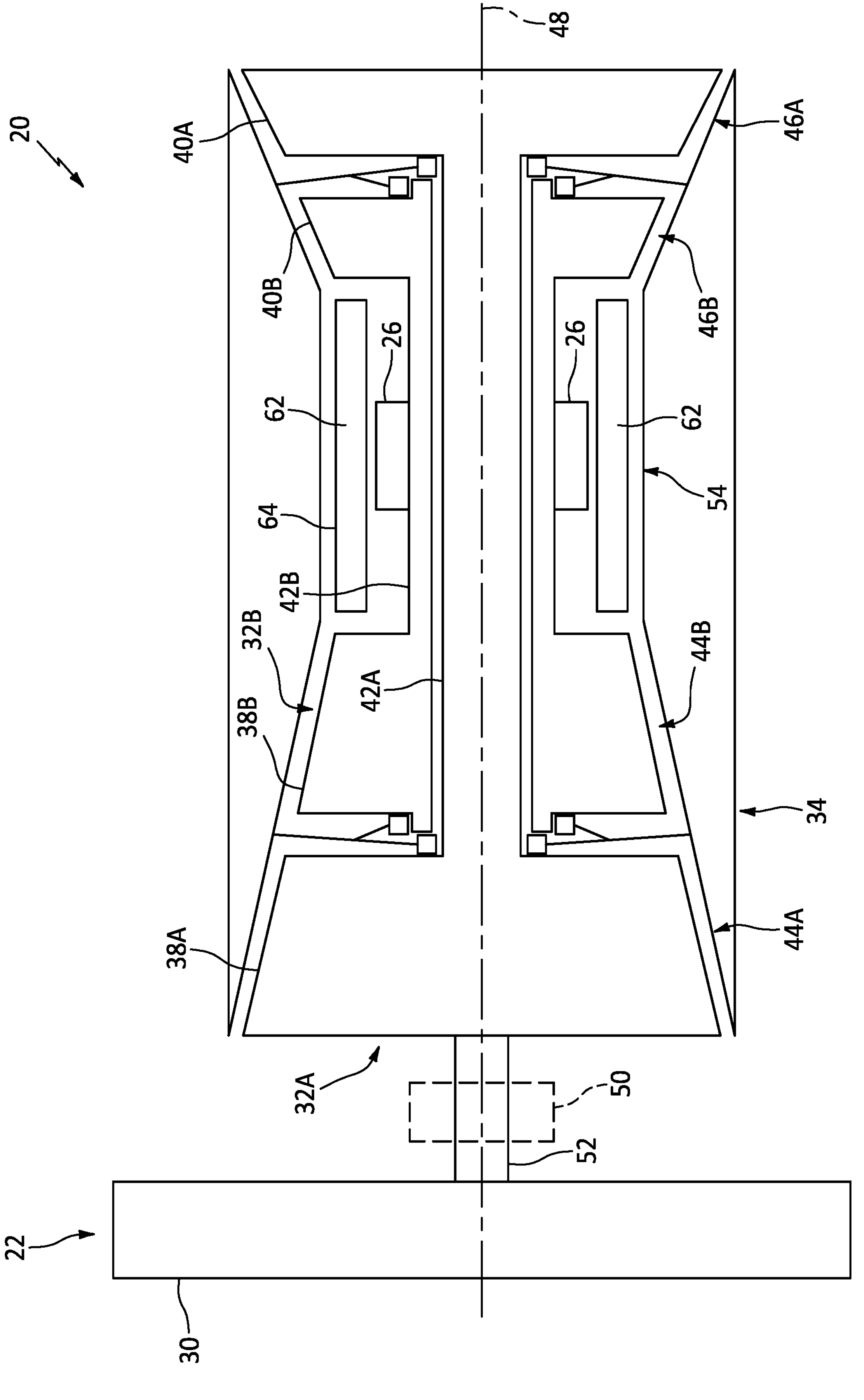
FIG. 11 is a schematic illustration of the gas turbine engine configured with an additional compressor rotor.

In some embodiments, referring to FIG. 1, the first rotating structure 32A is configured without a driven rotor within the engine core 24. In other embodiments however, referring to FIG. 11, the first rotating structure 32A may also include a bladed first structure compressor rotor 38A within the engine core 24. The first structure compressor rotor 38A of FIG. 11 is configured as a low pressure compressor (LPC) rotor. This first structure compressor rotor 38A is arranged within and part of a low pressure compressor (LPC) section 44A of the engine core 24. With such a configuration, the first structure shaft 42A may extend axially between and connect the first structure compressor rotor 38A to the first structure turbine rotor 40A.

In some embodiments, the gas turbine engine 20 of FIGS. 1 and 11 may be configured without an accessory gearbox. An accessory gearbox is typically provided to mechanically drive accessories such as a generator and pumps. An accessory gearbox also provides a path for connecting a rotating structure with an engine core to a starter motor. However, the starter motor and the generator may be replaced by the electric machine 26. In addition, the accessories may be replaced by electrically driven accessories powered by the electric machine 26 and/or the power source. Configuring the gas turbine engine 20 without the accessory gearbox can further reduce the size, weight and complexity of the gas turbine engine 20. Of course, in other embodiments, the gas turbine engine 20 may be configured with an accessory gearbox to mechanically drive one or more accessories.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for a gas turbine engine, comprising:

an engine core including a first rotating structure, a second rotating structure, a combustor and a flowpath, the first rotating structure including a first structure turbine rotor, and the second rotating structure including a second structure compressor rotor, a second structure turbine rotor and a second structure shaft connecting the second structure compressor rotor to the second structure turbine rotor, wherein the second structure compressor rotor, the combustor, the second structure turbine rotor and the first structure turbine rotor are arranged sequentially along the flowpath;

an electric machine arranged within the engine core, the electric machine including an electric machine rotor and an electric machine stator adjacent the electric machine rotor, the electric machine rotor rotatable with the second rotating structure and located between the second structure compressor rotor and the first structure turbine rotor;

a first bearing and a second bearing rotatably supporting the second rotating structure, wherein the electric machine is disposed between the first bearing and the second bearing; and a lubrication system configured to direct lubricant through a first internal volume of the electric machine stator and a second internal volume of the electric machine rotor, in series, from the second internal volume through both a third internal volume of the first bearing and a fourth internal volume of the second bearing, in parallel, and from both the third internal volume and the fourth internal volume to a fifth internal volume of a lubricant collector, wherein the electric machine and the first bearing are disposed within a same bearing compartment.

2. The assembly of claim 1, wherein the second rotating structure is rotatable about an axis; and the electric machine is located axially between the second structure compressor rotor and the second structure turbine rotor.

3. The assembly of claim 1, wherein the combustor is radially outboard of and circumscribes the electric machine.

4. The assembly of claim 1, wherein a portion of the flowpath between the combustor and the second structure turbine rotor is radially outboard of and circumscribes the electric machine.

5. The assembly of claim 1, wherein the second rotating structure is rotatable about an axis; and the second structure turbine rotor is located axially between the electric machine and the second structure compressor rotor.

6. The assembly of claim 1, wherein the electric machine is configurable as at least one of an electric motor during a motor mode of operation; or an electric generator during a generator mode of operation.

7. The assembly of claim 1, wherein the electric machine rotor is mounted to the second structure shaft.

8. The assembly of claim 1, wherein the second rotating structure is rotatable about an axis; and the electric machine rotor is axially adjacent at least one the first bearing or the second bearing.

9. The assembly of claim 1, further comprising an engine case housing and extending circumferentially about the first rotating structure, the second rotating structure, the combustor and the electric machine.

10. The assembly of claim 1, further comprising a propulsor rotor outside of the engine core, the propulsor rotor rotatably driven by the first rotating structure.

11. The assembly of claim 1, wherein the first rotating structure further includes a first structure compressor rotor and a first structure shaft connecting the first structure compressor rotor to the first structure turbine rotor; and the first structure compressor rotor, the second structure compressor rotor, the combustor, the second structure turbine rotor and the first structure turbine rotor are arranged sequentially along the flowpath.

12. An assembly for a gas turbine engine, comprising:

an engine core including a rotating structure, a combustor and a flowpath, the rotating structure including a compressor rotor, a turbine rotor and a shaft connecting the compressor rotor to the turbine rotor, wherein the compressor rotor, the combustor and the turbine rotor are arranged sequentially along the flowpath;

an electric machine arranged within the engine core, the electric machine including an electric machine rotor and an electric machine stator adjacent the electric machine rotor, the electric machine rotor rotatable with the rotating structure, wherein the combustor is arranged radially outboard of and extends circumferentially about the electric machine;

a plurality of bearings rotatably supporting the shaft, the plurality of bearings including a first bearing and a second bearing, the electric machine rotor disposed between the first bearing and the second bearing and mounted to the shaft, and the electric machine and the plurality of bearings disposed within a same bearing compartment; and a lubrication system configured to direct lubricant through a lubricant circuit, and the lubricant circuit including a rotor volume formed by the electric machine rotor, a stator volume formed by the electric machine stator, bearing volumes formed by the plurality of bearings, and a collector volume formed by a lubricant collector, wherein the stator volume is upstream of the rotor volume, the rotor volume is upstream of the bearing volumes, the bearing volumes are in parallel, and the bearing volumes are upstream of the collector volume.

13. The assembly of claim 12, wherein the rotating structure is rotatable about an axis; and the electric machine rotor is located axially between the compressor rotor and the turbine rotor.

14. The assembly of claim 12, wherein the rotating structure comprises a high pressure spool.

* * * * *